(12) United States Patent
Bradley et al.

(10) Patent No.: US 7,076,981 B2
(45) Date of Patent: Jul. 18, 2006

(54) ELECTROMAGNETIC FORMATION OF FUEL CELL PLATES

(76) Inventors: John R. Bradley, 885 Hawksmoore Dr., Clarkston, MI (US) 48348; James G. Schroth, 6011 Elmoor, Troy, MI (US) 48098; Glenn S. Daehn, 2076 Fairfax Rd., Columbus, OH (US) 43221

( * ) Notice: Subject to any disclaimer, the term of this patent is extended or adjusted under 35 U.S.C. 154(b) by 142 days.

(21) Appl. No.: 10/813,580

(22) Filed: Mar. 30, 2004

(65) Prior Publication Data

US 2005/0217334 A1    Oct. 6, 2005

(51) Int. Cl.
*B21D 26/14* (2006.01)
*B21J 5/04* (2006.01)

(52) U.S. Cl. .................. 72/56; 72/379.2; 29/419.2
(58) Field of Classification Search .............. 72/56, 72/707, 430, 54, 57; 29/419.2
See application file for complete search history.

(56) References Cited

U.S. PATENT DOCUMENTS

| | | | |
|---|---|---|---|
| 3,365,522 A * | 1/1968 | Inoue | ................ 264/450 |
| 5,824,998 A | 10/1998 | Livshiz et al. | |
| 5,860,306 A | 1/1999 | Daehn et al. | |
| 6,040,120 A | 3/2000 | Matsushita et al. | |
| 6,047,582 A | 4/2000 | Daehn et al. | |
| 6,050,121 A | 4/2000 | Daehn et al. | |
| 6,085,562 A | 7/2000 | Daehn et al. | |
| 6,128,935 A | 10/2000 | Daehn et al. | |
| 6,227,023 B1 | 5/2001 | Daehn et al. | |
| 6,708,542 B1 * | 3/2004 | Gafri et al. | ................ 72/56 |
| 6,938,449 B1 * | 9/2005 | Kusunoki et al. | ................ 72/57 |

* cited by examiner

*Primary Examiner*—Derris H. Banks
*Assistant Examiner*—Debra Wolfe

(57) ABSTRACT

A scheme for electromagnetic formation of fuel cell plates is provided. In accordance with one embodiment of the present invention, a method of forming a flow field plate is provided where an electromagnetic actuator is arranged opposite a profiled surface of a die portion. The profiled surface of the die portion is configured to at least partially define a network of flow field plate flow passages. The electromagnetic actuator is configured to generate a magnetic field upon activation and a sheet of material is positioned between the electromagnetic actuator and the profiled die surface. The sheet of material is characterized by an electrical conductivity sufficient to yield a repulsive electromagnetic force between the actuator and the sheet upon activation of the actuator. The passages are formed by driving the electromagnetic actuator such that the repulsive force is of sufficient intensity to deform the sheet against the profiled die surface.

19 Claims, 3 Drawing Sheets

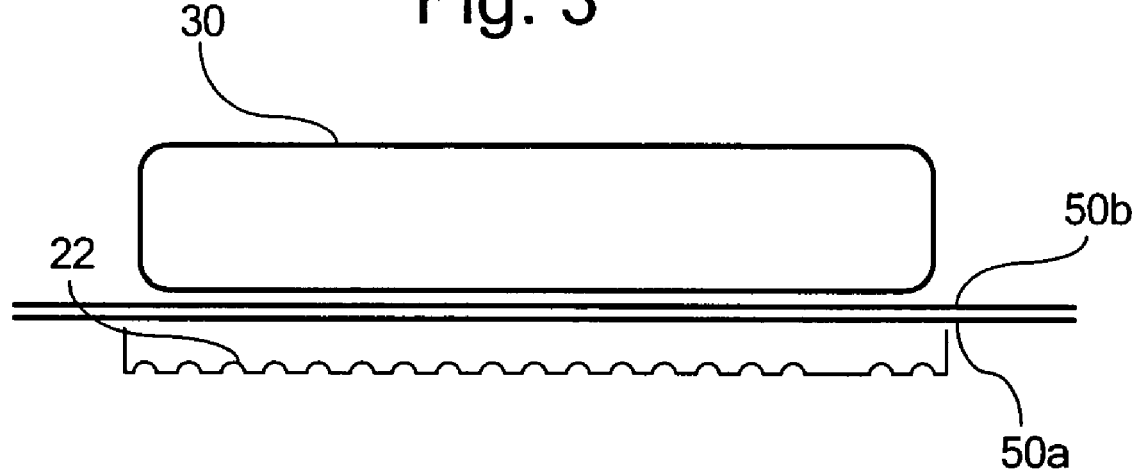

ELECTROMAGNETIC FORMATION OF FUEL CELL PLATES

CROSS-REFERENCE TO RELATED APPLICATIONS

This application is related to U.S. patent application Ser. No. 10/813,579, filed concurrently herewith.

BACKGROUND OF THE INVENTION

The present invention relates to electrochemical cells and, more particularly, to the formation of fuel cell plates through an electromagnetic metal forming process.

BRIEF SUMMARY OF THE INVENTION

According to the present invention, a scheme for electromagnetic formation of fuel cell plates is provided. In accordance with one embodiment of the present invention, a method of forming a flow field plate is provided where an electromagnetic actuator is arranged opposite a profiled surface of a die portion. The profiled surface of the die portion is configured to at least partially define a network of flow field plate flow passages. The electromagnetic actuator is configured to generate a magnetic field upon activation and a sheet of material is positioned between the electromagnetic actuator and the profiled die surface. The sheet of material is characterized by an electrical conductivity sufficient to yield a repulsive electromagnetic force between the actuator and the sheet upon activation of the actuator. The network of flow passages in the sheet is formed by driving the electromagnetic actuator such that the repulsive force is of sufficient intensity to deform the sheet against the profiled die surface.

In accordance with another embodiment of the present invention, an apparatus for forming a flow field plate is provided. The apparatus comprises a die portion, an electromagnetic actuator, and a conductive frame. The conductive frame is configured to (i) secure the sheet of material in electrical contact with the conductive frame in a position between the electromagnetic actuator and the profiled die surface, (ii) permit formation of the network of flow passages in the sheet through deformation of the sheet of material against the profiled die surface upon activation of the electromagnetic actuator, and (iii) define a return path for eddy currents induced in the sheet of material upon activation of the electromagnetic actuator.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 3 is a schematic illustration of a portion of an apparatus for deforming a target sheet of material according to the present invention.

DETAILED DESCRIPTION

Figure 1:
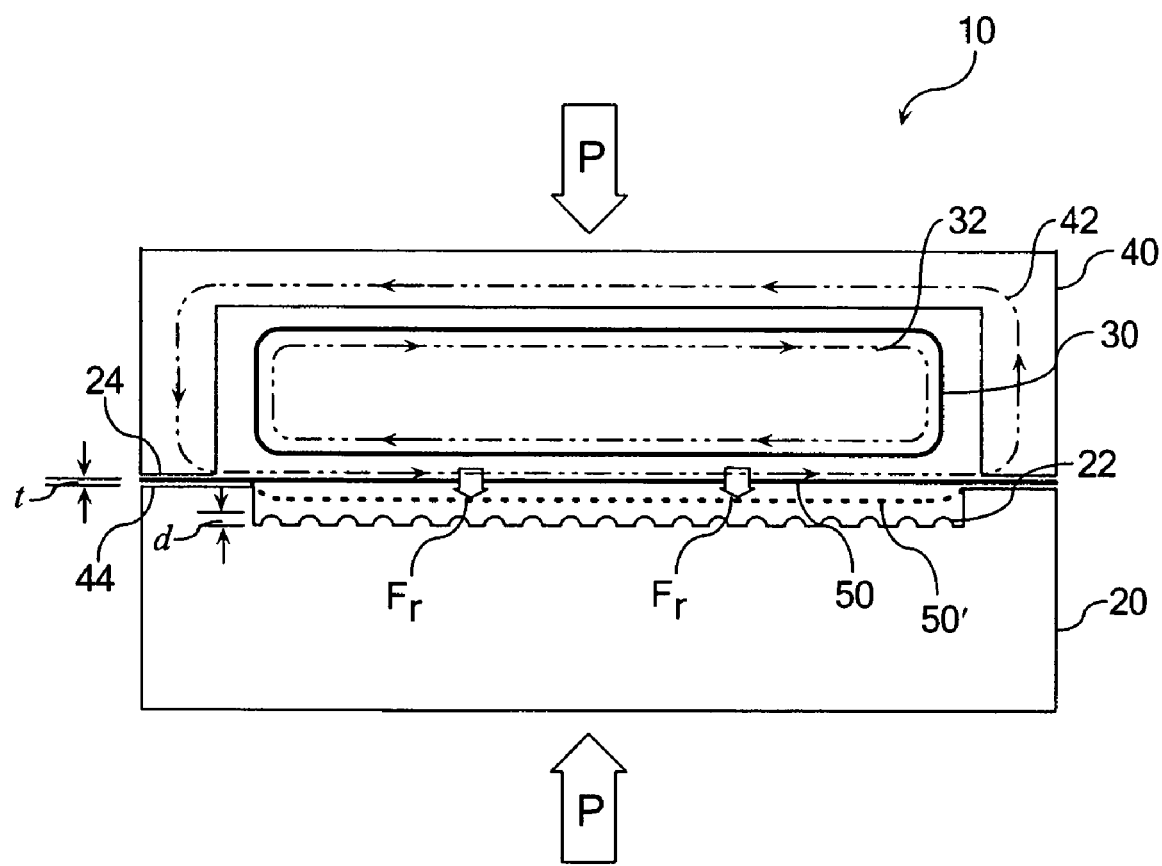
FIG. 1 is a schematic illustration of an apparatus for deforming a sheet of material according to the present invention.

Referring initially to FIG. 1, a method and apparatus for deforming a sheet of material is illustrated. Generally, the sheet deforming apparatus 10 comprises a die portion 20, an electromagnetic actuator 30, and a conductive frame 40. The die portion 20 defines a profiled die surface 22. The electromagnetic actuator 30 is arranged opposite the profiled surface 22 of the die portion 20. A sheet of material 50 is secured in a position between the electromagnetic actuator 30 and the profiled die surface 22.

It is contemplated that the electromagnetic actuator 30 may assume a variety of suitable configurations including, but not limited to, those that comprise an inductive coil. Suitable inductive coils include, but are not limited to, those that are configured as a multi-turn substantially helical coil. It is further contemplated that suitable helical coils may define a variety of geometries including but not limited to substantially circular, ellipsoidal, parabolic, quadrilateral, and planar geometries, and combinations thereof. Those practicing the present invention should appreciate that the art of electromagnetic forming is replete with teachings related to actuator design.

Upon activation of the electromagnetic actuator 30, e.g., by providing a current pulse from a capacitor bank controlled by a suitable actuator controller, the intense electromagnetic field of the actuator 30 generates a repulsive electromagnetic force between the actuator 30 and the sheet 50. As will be appreciated by those of ordinary skill in the art of electromagnetic forming, the magnitude of the repulsive force is a function of a variety of factors including the conductivity of the sheet 50 and, where an inductive coil is employed as the actuator 30, the number of turns of the actuator coil. The nature in which the actuator 30 is driven is beyond the scope of the present invention and may be readily gleaned from teachings in the art of electromagnetic forming. It is noted however that typically the actuator 30 is driven by the controlled periodic discharge of a capacitor, generating short, high voltage, high current electrical discharges through a conductive coil of the actuator 30.

The electromagnetic actuator driven sheet deforming apparatus 10 of the present invention can be operated to yield strain rates of about 1000 $sec^{-1}$, or at least about 100 $sec^{-1}$, and sheet velocities exceeding 50 m/s. At such strain rates and sheet velocities, many materials that typically exhibit low formability at lower strain rates and sheet velocities transition to a state of hyper-plasticity characterized by relatively good formability. Aluminum, aluminum alloys, magnesium, and magnesium alloys are good examples of such materials. In many instances, materials deformed according to the present invention also exhibit reduced springback, where a deformed material tends to return partially to its original, un-deformed shape. As a result, it is often not necessary to compensate for springback in the deforming process.

The controller driving the actuator 30 may also be configured to drive the actuator in an induction heating mode characterized by voltage and current profiles selected to heat the actuator itself and, through induction, to heat the sheet 50. Once heated to a suitable temperature, the actuator controller can be configured to drive the actuator in the above-described electromagnetic forming mode. In this manner, by preheating the sheet of material 50, the present invention may be utilized to deform materials that would otherwise not lend themselves to un-heated or cold electromagnetic forming. The voltage and current profile and the duration of the induction heating mode should be sufficient to raise the temperature of the sheet of material 50 to a temperature at which the material at issue becomes significantly more ductile. For example, by way of illustration and not limitation, the temperature of the sheet of material 50 may be raised to about one-half of its absolute melting temperature. The electromagnetic forming mode should follow the induction heating mode before the material cools below a suitable deforming temperature. For example, and by way of illustration only, in the case of magnesium and magnesium alloys, the induction heating mode should be sufficient to raise the temperature of the magnesium or magnesium alloy material to above about 200° C.

The pulsed magnetic field generated by the actuator 30 induces eddy currents in the sheet 50. The conductive frame 40 defines a return path 42 for eddy currents induced in the sheet of material 50 upon activation of the electromagnetic actuator 30. As is illustrated in FIG. 1, the eddy current return path 42 defines a circuit comprising portions of the sheet 50 and the conductive frame 40. The sheet 50 and the conductive frame 40 may be configured such that the eddy current return path 42 and the electrical current path 32 defined by the electromagnetic actuator 30 define opposing current loops. For example, as is illustrated in FIG. 1, where the actuator 30 comprises a helical coil of substantially rectangular cross section, the frame 40 may be configured as a shell bounding the coil such that the opposing current loops are defined across a plurality of parallel cross sections of the apparatus 10. In this manner, the eddy current return path 42 circuit mirrors a cross section of the electrical current path 32 defined by the electromagnetic actuator 30. In cases where it is impractical to configure the eddy current return path 42 to mirror the electrical current path 32 in the manner illustrated in FIG. 1, it will be sufficient to ensure that the sheet 50 and the frame 40 are configured such that substantial portions of the eddy current return path 42 mirror corresponding portions of the electrical current path 32 defined by the actuator 30.

The respective contributions of the conductive frame 40 and the sheet 50 to the overall circuit defined by the eddy current return path 42 may also vary depending upon the particular operational requirements of the sheet deforming apparatus 10. The conductive frame 40 may be configured to comprise a majority of the circuit defined by the eddy current return path 42. In this manner, if the per unit length electrical resistance of the sheet material 50 is greater than the per unit length electrical resistance of the frame 40, the overall effect of the sheet 50 on the electrical resistance of the return path 42 may be minimized. As a result, the sheet deforming apparatus of the present invention may be used in the electromagnetic formation of sheet materials having relatively low electrical conductivities.

The conductive frame 40 is also configured to secure the sheet 50 and permit deformation of the sheet 50 against the profiled die surface 22 upon activation of the electromagnetic actuator 30. The direction of the repulsive force $F_r$ and a partially deformed sheet 50'0 are illustrated in FIG. 1. The conductive frame 40 and the die portion 20 each define opposing sheet engaging portions 24, 44 configured to engage a periphery of the sheet 50 there between while ensuring that a remaining portion of the sheet of material 50 is substantially free to move in the direction of the profiled die surface 22 in response to the repulsive force. It is contemplated that the sheet engaging portions 24, 44 may be configured to engage less than the entire periphery of the sheet 50 or substantially the entire periphery of the sheet 50, depending upon the particular design requirements at issue. In any event, the conductive frame 40 and the die portion 20 are configured to permit significant compression of the sheet 50 between the sheet engaging portions 24, 44. The appropriate amount of compression is dictated by a preference for reliable electrical contact between the sheet 50 and the frame 40.

To affect sufficient compression of the sheet 50, the apparatus 10 may further comprise a press, illustrated schematically with reference to the directional arrows P in FIG. 1, configured to impart a compressive force upon the sheet of material 50 secured between the conductive frame 40 and the die portion 20. It will typically be advantageous to ensure that the compressive force exceeds the repulsive electromagnetic force generated between the actuator 30 and the sheet 50 by at least one order of magnitude or by an amount sufficient to ensure substantially constant conditions of electrical contact between the sheet 50 and the conductive frame 40 as the electromagnetic actuator 30 cycled from an active to an inactive state.

It is contemplated that the conductive frame 40 may be formed of any of a variety of suitable materials including, but not limited to, metals and metal alloys that are characterized by high electrical conductivity, that provide for good electrical contact, and that are not subject to excessive sparking or electrical arcing. Aluminum, copper, gold, and alloys thereof are examples of suitable candidates. Gold and copper may be particularly suitable when employed as a plating component. Plated and un-plated steels are also viable candidates.

Figure 2:
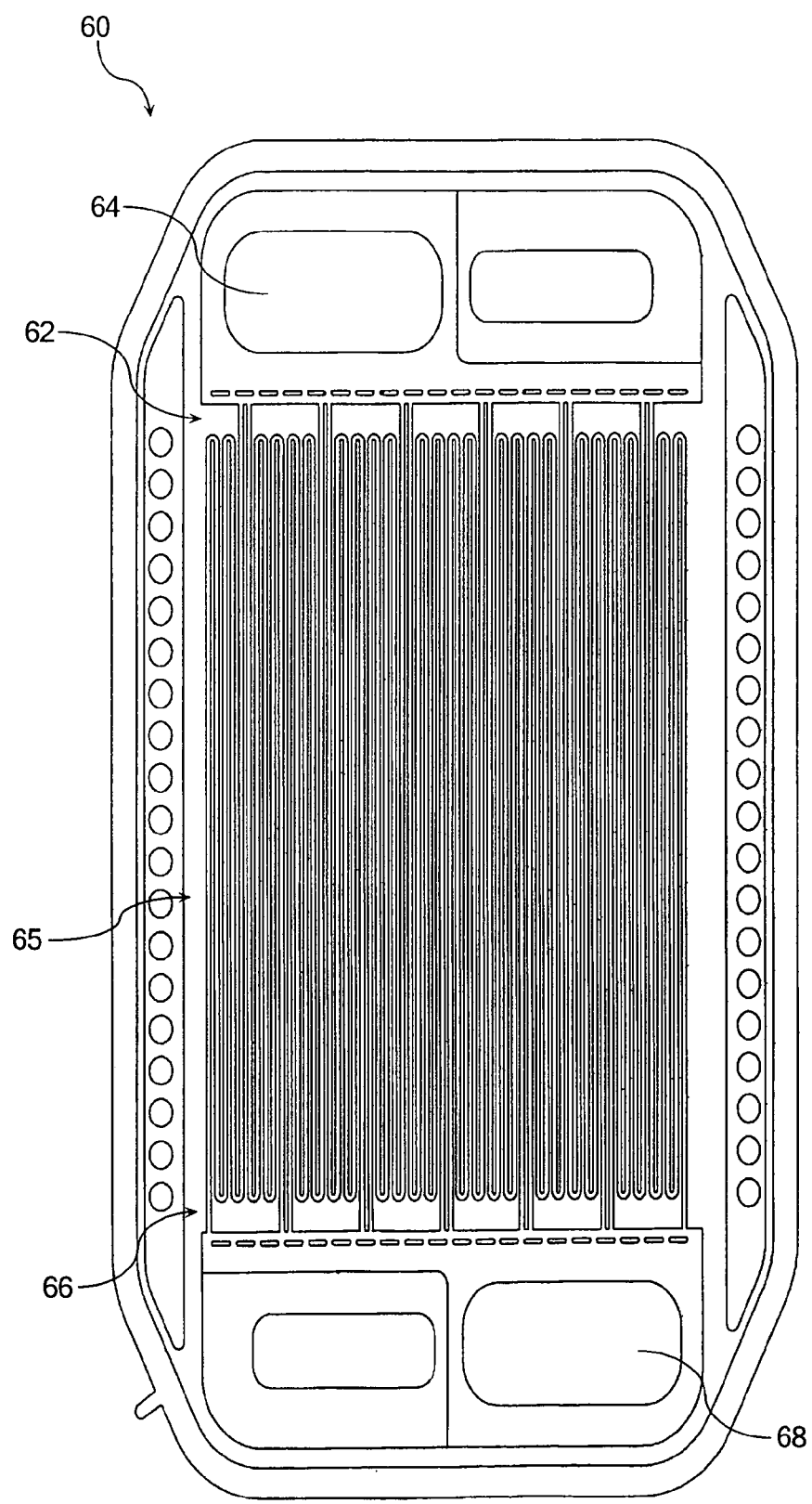
FIG. 2 is an illustration of a flow field plate that may be formed according to the present invention.

The sheet deforming apparatus 10 of the present invention is suitable for use in a variety of contexts including, for example, the formation of fuel cell flow field plates. Referring to FIG. 2, fuel cell flow field plates 60 typically comprise a network of flow passages 65 formed therein, as will be appreciated by those familiar with the art of fuel cell construction and design. The network of flow passages 65 is typically distributed uniformly across a majority of the flow field plate 60. Often, the network of flow passages 65 defines a serpentine or partially serpentine path across a face of the flow field plate 60. The network of flow passages 65 also typically includes a plurality of supply inlets 62 in communication with a common supply manifold 64 and a plurality of exhaust outlets 66 in communication with a common exhaust manifold 68. The network of flow passages 65 serve to supply reactants to the flow field of the fuel cell and receive reactant products discharged from the flow field. The flow field configuration permits the reactant gases to be transported so as to supply the gases evenly to the entire active area of the corresponding fuel cell electrode with very low reactant gas pressure drop.

Referring to FIG. 1, the present invention is well suited for the formation of fuel cell flow field plates because it is capable of forming flow passages that are characterized by a flow passage depth d that is significantly greater than the thickness t of the sheet of material 50. In the fuel cell context, typical sheet material thicknesses t are below about 1 mm while flow passage depths d may be several times as large as the thickness t of the sheet of material 50. It is contemplated that the present invention is capable of providing flow field plates having significantly greater flow passage depths than those that are available through conventional stamping techniques.

It is further contemplated that the present invention is particularly well suited for use with fuel cell sheet materials because of its utility with respect to lightweight, corrosion-resistant, and impermeable materials that might not otherwise lend themselves to deformation against a profiled die surface, i.e., through stamping or otherwise. Examples of such materials include, but are not limited to, aluminum, aluminum alloys, magnesium, magnesium alloys, etc. The present invention is also well suited for use with high strength steel and stainless steel sheet materials. Many of these fuel cell sheet materials are simply not well suited for conventional deformation against a profiled die surface but may be deformed according to the scheme of the present invention because the sheet deforming apparatus 10 of the present invention is provided with an electromagnetic actuator that may be driven to yield strain rates of about $1 \times 10^3$ sec$^{-1}$, or at least about 100 sec$^{-1}$, and sheet velocities exceeding 50 m/s.

The weight of components and materials is often a primary concern in the fuel cell context and in other applications. Although the present invention is suitable for deformation of low and high density materials, it particularly well suited for providing light weight deformed sheet components because it is capable of deforming relatively low density sheet materials that can not be successfully deformed in conventional forming processes. For example, the present invention is well suited for deformation of metal alloys having densities below about 5 g/cm$^3$-substantially less than those of carbon steel, stainless steel, ingot iron, ductile cast iron, malleable iron, and other materials of comparable density. For example, rolled aluminum alloy 3003 is characterized by a density of about 2.73 g/cm$^3$ while stainless steel (type 304) is characterized by a density of about 8.02 g/cm$^3$ and carbon steel is characterized by a density of about 7.86 g/cm$^3$.

Referring to FIG. 3, it is noted that the present invention may also be adapted to include a target sheet 50a of relatively low conductivity and a driver sheet 50b of relatively high conductivity. The driver sheet 50b is interposed between the target sheet 50a and the electromagnetic actuator 30. The target sheet 50a is interposed between driver sheet 50b and the profiled die surface 22. Repulsive forces imparted to the conductive driver sheet 50b by the actuator 30 can be imparted to the target sheet 50a through simple mechanical contact. In this manner, the sheet deforming apparatus 10 of the present invention may be configured to deform sheet materials, i.e., target sheets 50a, that would otherwise not have sufficient conductivity for deformation through electromagnetic forming.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially"0 is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of forming a flow field plate, said flow field plate comprising a network of flow passages formed therein, wherein said method comprises:

arranging an electromagnetic actuator opposite a profiled surface of a die portion, wherein said profiled surface of said die portion is configured to at least partially define said network of flow passages, and wherein said electromagnetic actuator is configured to generate a magnetic field upon activation;

positioning a sheet of material between said electromagnetic actuator and said profiled die surface, wherein said sheet of material is characterized by a conductivity sufficient to yield a repulsive electromagnetic force between said actuator and said sheet upon activation of said actuator; and forming said network of flow passages in said sheet by driving said electromagnetic actuator such that said repulsive force is of sufficient intensity to deform said sheet against said profiled die surface.

2. A method of forming a flow field plate as claimed in claim 1 wherein said electromagnetic actuator is driven such that said repulsive force is of sufficient intensity to yield a strain rate of at least about 100 sec$^{-1}$ in said sheet.

3. A method of forming a flow field plate as claimed in claim 1 wherein said electromagnetic actuator is driven such that said repulsive force is of sufficient intensity to yield a deformation velocity of at least about 50 m/s.

4. A method of forming a flow field plate as claimed in claim 1 wherein said network of flow passages is distributed substantially uniformly across a majority of said flow field plate.

5. A method of forming a flow field plate as claimed in claim 1 wherein said network of flow passages includes a plurality of supply inlets in communication with a common supply manifold and a plurality of exhaust outlets in communication with a common exhaust manifold.

6. A method of forming a flow field plate as claimed in claim 1 wherein said network of flow passages define respective lands along a planar face of said flow field plate between adjacent ones of said flow passages, said lands collectively defining said planar face of said flow field plate.

7. A method of forming a flow field plate as claimed in claim 1 wherein said flow passages are characterized by a flow passage depth at least twice as large as a thickness of said sheet of material.

8. A method of forming a flow field plate as claimed in claim 7 wherein said sheet of material is characterized by a thickness of less than about 1 mm.

9. A method of forming a flow field plate as claimed in claim 1 wherein said flow passages are characterized by a flow passage depth at least 3 times as large as a thickness of said sheet of material.

10. A method of forming a flow field plate as claimed in claim 9 wherein said sheet of material is characterized by a thickness of less than about 1 mm.

11. A method of forming a flow field plate as claimed in claim 1 wherein said sheet of material comprises aluminum or an aluminum alloy.

12. A method of forming a flow field plate as claimed in claim 1 wherein said sheet of material comprises steel, magnesium, or combinations thereof.

13. A method of forming a flow field plate as claimed in claim 1 wherein said sheet of material comprises a metal alloy having a density of below about 5 g/cm$^3$.

14. A method of forming a flow field plate as claimed in claim 1 wherein said sheet of material comprises a metal or metal alloy characterized by a density substantially less than that of carbon steel, stainless steel, ingot iron, ductile cast iron, malleable iron, and other materials of comparable density.

15. A method of forming a flow field plate as claimed in claim 1 wherein said sheet of material comprises a target sheet of relatively low conductivity and a driver sheet of relatively high conductivity.

16. A method of forming a flow field plate as claimed in claim 15 wherein said driver sheet is interposed between said target sheet and said electromagnetic actuator.

17. A method of forming a flow field plate as claimed in claim 15 wherein said target sheet is interposed between said driver sheet and said profiled die surface.

18. A method of forming a flow field plate, said flow field plate comprising a network of flow passages formed therein, wherein said method comprises:
   arranging an electromagnetic actuator opposite a profiled surface of a die portion, wherein said profiled surface of said die portion is configured to at least partially define said network of flow passages such that said network of flow passages is distributed uniformly across a majority of said flow field plate defining a serpentine path across a face of said flow field plate, said network of flow passages includes a plurality of supply inlets in communication with a common supply manifold and a plurality of exhaust outlets in communication with a common exhaust manifold, said network of flow passages define respective lands along a planar face of said flow field plate between adjacent ones of said flow passages, said lands collectively defining said planar face of said flow field plate, said network of flow passages are characterized by a flow passage depth at least three times as large as a thickness of said sheet of material;
   positioning a sheet of material between said electromagnetic actuator and said profiled die surface, wherein
      said electromagnetic actuator is configured to generate a magnetic field upon activation,
      said sheet of material comprises a metal or metal alloy characterized by a density substantially less than that of carbon steel, stainless steel, ingot iron, ductile cast iron, malleable iron, and other materials of comparable density, and
      said sheet of material is characterized by a conductivity sufficient to yield a repulsive electromagnetic force between said actuator and said sheet upon activation of said actuator; and
   forming said network of flow passages in said sheet by driving said electromagnetic actuator such that said repulsive force is of sufficient intensity to deform said sheet against said profiled die surface.

19. An apparatus for forming a flow field plate, said flow field plate comprising a network of flow passages formed therein, said apparatus comprising a die portion, an electromagnetic actuator, and a conductive frame, wherein:
   said die portion defines a profiled surface;
   said profiled surface of said die portion is configured to at least partially define said network of flow passages;
   said electromagnetic actuator is arranged opposite said profiled surface of said die portion; and
   said conductive frame is configured to
      secure said sheet of material in electrical contact with said conductive frame in a position between said electromagnetic actuator and said profiled die surface,
      permit formation of said network of flow passages in said sheet through deformation of said sheet of material against said profiled die surface upon activation of said electromagnetic actuator, and
      define a return path for eddy currents induced in said sheet of material upon activation of said electromagnetic actuator.

* * * * *